(12) United States Patent
Hayashi

(10) Patent No.: US 11,588,942 B2
(45) Date of Patent: Feb. 21, 2023

(54) IMAGE READING CONTROL METHOD AND APPARATUS EXECUTING DIFFERENT MODES OF DOCUMENT DISCHARGE BASED ON DETECTED TARGET IMAGE SATISFYING PRESET SORTING CONDITION

(71) Applicant: KYOCERA Document Solutions Inc., Osaka (JP)

(72) Inventor: Shinji Hayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/654,557

(22) Filed: Mar. 11, 2022

(65) Prior Publication Data
US 2022/0303397 A1   Sep. 22, 2022

(30) Foreign Application Priority Data
Mar. 17, 2021   (JP) .............................. JP2021-044027

(51) Int. Cl.
*H04N 1/00* (2006.01)

(52) U.S. Cl.
CPC ..... *H04N 1/00005* (2013.01); *H04N 1/00013* (2013.01); *H04N 1/00082* (2013.01); *H04N 1/00633* (2013.01); *H04N 1/00795* (2013.01)

(58) Field of Classification Search
CPC ........... H04N 1/00795; H04N 1/00798; H04N 1/00801; H04N 1/00803; H04N 1/00806; H04N 1/00005; H04N 1/00013; H04N 1/00082; H04N 1/00631; H04N 1/00633
See application file for complete search history.

(56) References Cited

U.S. PATENT DOCUMENTS

| | | | | |
|---|---|---|---|---|
| 5,430,536 | A * | 7/1995 | Fullerton | H04N 1/00602 399/401 |
| 8,654,364 | B2 * | 2/2014 | Ogasawara | H04N 1/00631 358/1.13 |
| 8,792,106 | B2 * | 7/2014 | Iwayama | H04N 1/00795 358/1.12 |
| 11,148,899 | B2 * | 10/2021 | Morikawa | B65H 29/14 |
| 2022/0046139 | A1 * | 2/2022 | Lee | H04N 1/00525 |
| 2022/0299927 | A1 * | 9/2022 | Suese | G03G 15/6547 |

FOREIGN PATENT DOCUMENTS

JP   2012206841 A   10/2012

\* cited by examiner

*Primary Examiner* — Scott A Rogers
(74) *Attorney, Agent, or Firm* — Alleman Hall Creasman & Tuttle LLP

(57) ABSTRACT

A conveying device can selectively execute discharge processes of a plurality of discharge procedures each having a different mode of discharge to a discharge tray. An image reading portion reads images on document sheets conveyed along a conveyance path and outputs data about read images. An image reading control method includes detecting a target image that satisfies a predetermined sorting condition associated with any one of the plurality of discharge procedures from the read images. The image reading control method further includes, in a case where the target image is detected, executing a discharge control that causes the conveying device to execute the discharge process of the discharge procedure corresponding to the target image.

5 Claims, 4 Drawing Sheets

IMAGE READING CONTROL METHOD AND APPARATUS EXECUTING DIFFERENT MODES OF DOCUMENT DISCHARGE BASED ON DETECTED TARGET IMAGE SATISFYING PRESET SORTING CONDITION

INCORPORATION BY REFERENCE

This application is based upon and claims the benefit of priority from the corresponding Japanese Patent Application No. 2021-044027 filed on Mar. 17, 2021, the entire contents of which are incorporated herein by reference.

BACKGROUND

The present disclosure relates to an image reading control method and an image reading apparatus capable of selectively discharging document sheets, from which images are read, from a conveyance path by a plurality of procedures.

In a known image reading apparatus, a conveying device conveys document sheets on a supply tray along a conveyance path and selectively discharges the document sheets, from which images are read, from the conveyance path to one of two discharge trays. In this case, the destination of each document sheet is set in advance by users.

SUMMARY

An image reading control method according to an aspect of the present disclosure is a method of controlling an image reading apparatus. The image reading apparatus includes a supply tray, at least one discharge tray, a conveying device, and an image reading portion. The supply tray and the discharge tray can hold document sheets. The conveying device can convey the document sheets on the supply tray one by one along a conveyance path to discharge the document sheets from the conveyance path to the discharge tray. The conveying device can selectively execute discharge processes of a plurality of discharge procedures each having a different mode of discharge to the discharge tray. The image reading portion reads images on the document sheets conveyed along the conveyance path and outputs data about read images. The image reading control method includes detecting a target image that satisfies a predetermined sorting condition associated with any one of the plurality of discharge procedures from the read images. The image reading control method further includes, in a case where the target image is detected, executing a discharge control that causes the conveying device to execute the discharge process of the discharge procedure corresponding to the target image.

An image reading apparatus according to another aspect of the present disclosure includes the supply tray, the at least one discharge tray, the conveying device, the image reading portion, and a control portion that executes a process of the image reading control method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[Configuration of Image Reading Apparatus 1]

An image reading apparatus 1 according to a first embodiment is capable of conveying document sheets 9 and reading images on the conveyed document sheets 9.

Figure 1:
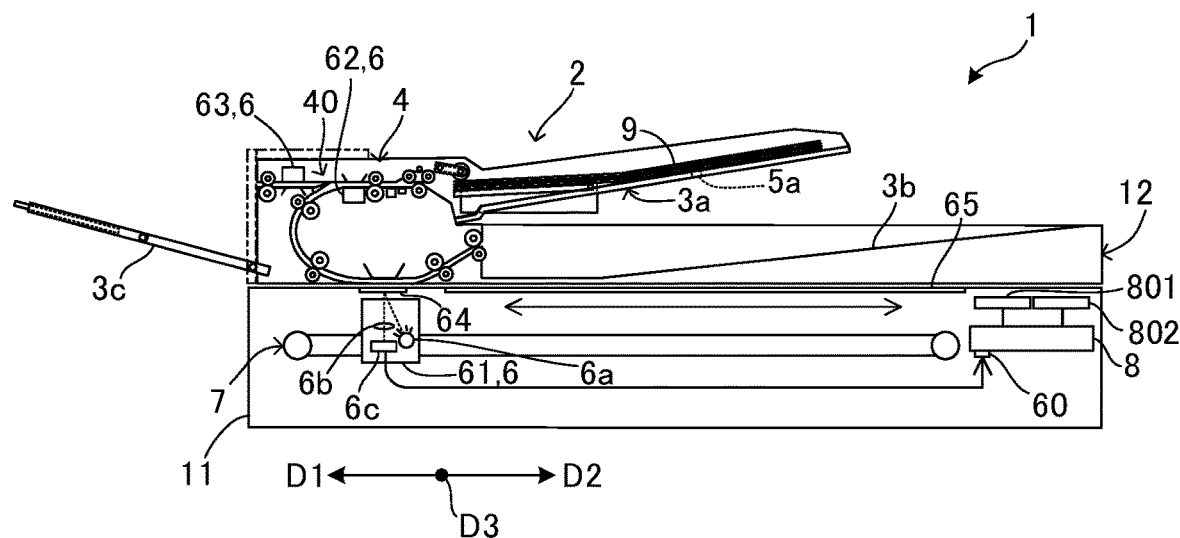
FIG. 1 is a configuration diagram of an image reading apparatus according to a first embodiment.

As shown in FIG. 1, the image reading apparatus 1 includes a body portion 11 and a cover portion 12 that covers the upper surface of the body portion 11. The body portion 11 is a housing that houses various types of components. The cover portion 12 is supported to be displaceable between a closed position at which the cover portion 12 covers the upper surface of the body portion 11 and an open position at which the cover portion 12 opens the upper surface of the body portion 11. The cover portion 12 is displaceably supported by a hinge (not shown) provided for the body portion 11.

The image reading apparatus 1 further includes a contact glass 64 and a platen glass 65 disposed on the upper surface of the body portion 11. The contact glass 64 and the platen glass 65 are transparent plate-like members.

The image reading apparatus 1 further includes a document sheet conveying device 2, an image reading portion 6, a moving mechanism 7, a control device 8, an operation device 801, and a display device 802. The document sheet conveying device 2 is integrated into the cover portion 12.

The document sheet conveying device 2 includes a supply tray 3a, a first discharge tray 3b, a conveyance path 40, a conveying device 4, a supplied document sheet sensor 5a, and a conveyed document sheet sensor 5b. The conveyance path 40 forms a path along which the document sheets 9 are conveyed.

The supply tray 3a and the first discharge tray 3b can hold the document sheets 9. In the present embodiment, the first discharge tray 3b is disposed below the supply tray 3a.

The supplied document sheet sensor 5a detects the document sheets 9 placed on the supply tray 3a. For example, the supplied document sheet sensor 5a includes a first displaceable member and a first detection sensor (both not shown).

The first displaceable member is displaced to a lower position below an upper position serving as an initial position upon receiving the load of the document sheets 9 on the supply tray 3a. The first detection sensor detects the first displaceable member displaced to the lower position.

The conveyed document sheet sensor 5b detects the document sheets 9 fed from the supply tray 3a to the conveyance path 40. For example, the conveyed document sheet sensor 5b includes a second displaceable member and a second detection sensor (both not shown).

The second displaceable member is displaced from a reference position to a retracted position by coming into contact with the document sheets 9 fed from the supply tray 3a to the conveyance path 40. The second detection sensor detects the second displaceable member displaced to the retracted position.

The conveying device 4 feeds the document sheets 9 on the supply tray 3a one by one to the conveyance path 40, conveys the document sheets 9 along the conveyance path 40, and then discharges the document sheets 9 onto the first discharge tray 3b.

In the description below, a horizontal direction along which the document sheets 9 are fed from the supply tray 3a is referred to as "first direction D1", and a direction opposite the first direction D1 is referred to as "second direction D2". In addition, a horizontal direction orthogonal to the first direction D1 and the second direction D2 is referred to as "third direction D3".

Figure 2:
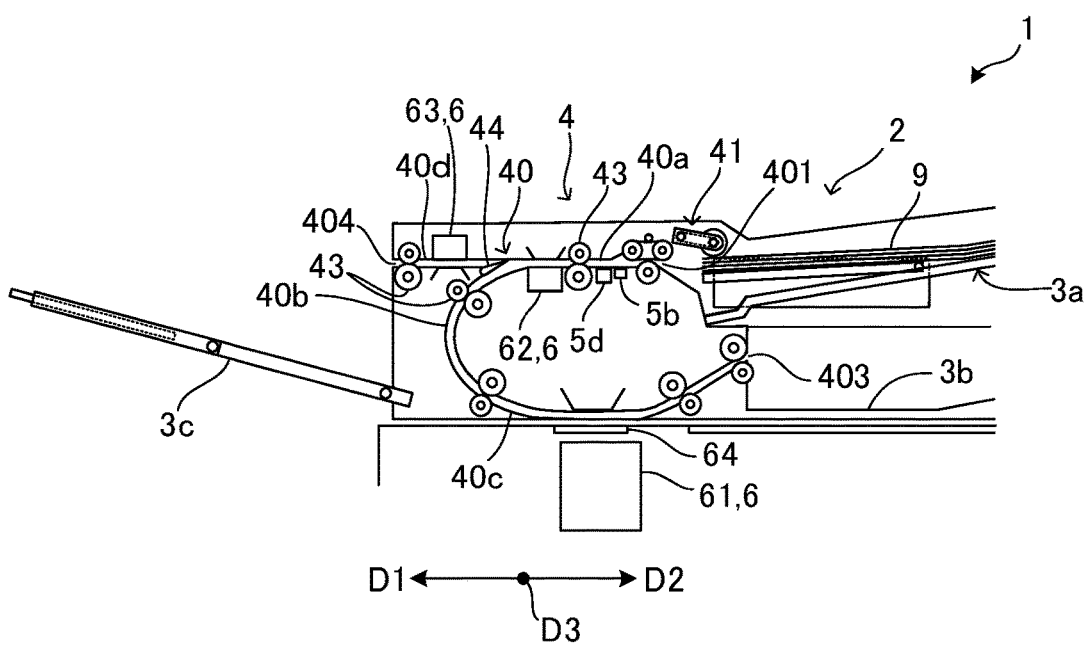
FIG. 2 is a configuration diagram of a main part of the image reading apparatus according to the first embodiment.

As shown in FIG. 2, the conveyance path 40 includes an incoming path 40a, a return path 40b, and a first outgoing path 40c. The incoming path 40a extends from a first entrance 401 corresponding to the supply tray 3a in the first direction D1. The conveyed document sheet sensor 5b detects the document sheets 9 fed to the incoming path 40a.

The return path 40b is a curved path connected to the incoming path 40a and turning back in the second direction D2 opposite the first direction D1. The first outgoing path 40c is connected to the return path 40b and extends in the second direction D2 to lead to a first exit 403 corresponding to the first discharge tray 3b. The first outgoing path 40c leads to the first exit 403 via a position along the upper surface of the contact glass 64.

The conveying device 4 includes a feed mechanism 41 corresponding to the supply tray 3a and pairs of conveying rollers 43 disposed along the conveyance path 40.

The feed mechanism 41 feeds the document sheets 9 on the supply tray 3a one by one to the incoming path 40a. In the present embodiment, the feed mechanism 41 feeds the topmost sheet in the document sheets 9 on the supply tray 3a to the incoming path 40a.

The pairs of conveying rollers 43 are rotationally driven by motors (not shown) to convey the document sheets 9 along the conveyance path 40.

The image reading portion 6 executes an image reading process of reading images formed on the document sheets 9 and outputting data about the read images. The image reading portion 6 can execute the image reading process on the document sheets 9 conveyed along the conveyance path 40. The image reading portion 6 can also execute the image reading process on the document sheets 9 placed on the platen glass 65. In the description below, the images read from the document sheets 9 by the image reading portion 6 are referred to as "read images".

In the present embodiment, the image reading portion 6 includes a first image reading portion 61, a second image reading portion 62, and an AFE (Analog Front End) 60.

In the description below, the upper surfaces of the document sheets 9 placed on the supply tray 3a are referred to as "first sides", and the lower surfaces of the document sheets 9 placed on the supply tray 3a are referred to as "second sides".

The first image reading portion 61 reads images on the first sides of the document sheets 9 passing through the first outgoing path 40c while being at a position corresponding to the contact glass 64. The second image reading portion 62 reads images on the second sides of the document sheets 9 passing through the incoming path 40a.

In the present embodiment, the first image reading portion 61 and the second image reading portion 62 each include a light-emitting portion 6a, a lens 6b, and an image sensor 6c (see FIG. 1). The light-emitting portions 6a, the lenses 6b, and the image sensors 6c extend in the third direction D3.

The light-emitting portions 6a emit light beams onto the document sheets 9. The lenses 6b guide the light beams reflected from the document sheets 9 to the respective image sensors 6c. The image sensors 6c are line sensors that determine the intensity of the light beams reflected from the document sheets 9 and that output detection signals as signals of the read images.

The AFE 60 converts the signals of the read images into digital image data and outputs the image data. The digital image data corresponds to the data about the read images.

In the example shown in FIG. 1, the first image reading portion 61 and the second image reading portion 62 are CISs (Contact Image Sensors) each including the light-emitting portion 6a, the lens 6b, and the image sensor 6c of the CMOS (Complementary Metal Oxide Semiconductor) type integrated together.

The moving mechanism 7 moves the first image reading portion 61 in a range from the position facing the contact glass 64 to a position facing the platen glass 65.

In a case where the document sheets 9 are conveyed by the conveying device 4, the moving mechanism 7 keeps the first image reading portion 61 at the position facing the contact glass 64.

In a case where the document sheets 9 are placed on the platen glass 65, the moving mechanism 7 moves the first image reading portion 61 along the platen glass 65. Thus, the image sensor 6c of the first image reading portion 61 reads the images on the document sheets 9 while the light-emitting portion 6a of the first image reading portion 61 scans the light beam over the document sheets 9 on the platen glass 65.

That is, when the conveying device 4 operates, the image reading portion 6 executes the image reading process on the document sheets 9 conveyed along the conveyance path 40. In contrast, when the conveying device 4 does not operate, the image reading portion 6 executes the image reading process on the document sheets 9 placed on the platen glass 65.

It is noted that the image sensor 6c of the first image reading portion 61 may be a CCD (Charge Coupled Device) sensor. In this case, the moving mechanism 7 moves the light-emitting portion 6a and the lens 6b while the image sensor 6c of the CCD type is fixed at a predetermined position.

The operation device 801 is configured to receive operations from users and includes, for example, operation buttons and a touch panel. The display device 802 is configured to display information and includes, for example, a panel display device such as a liquid crystal display unit.

Figure 3:
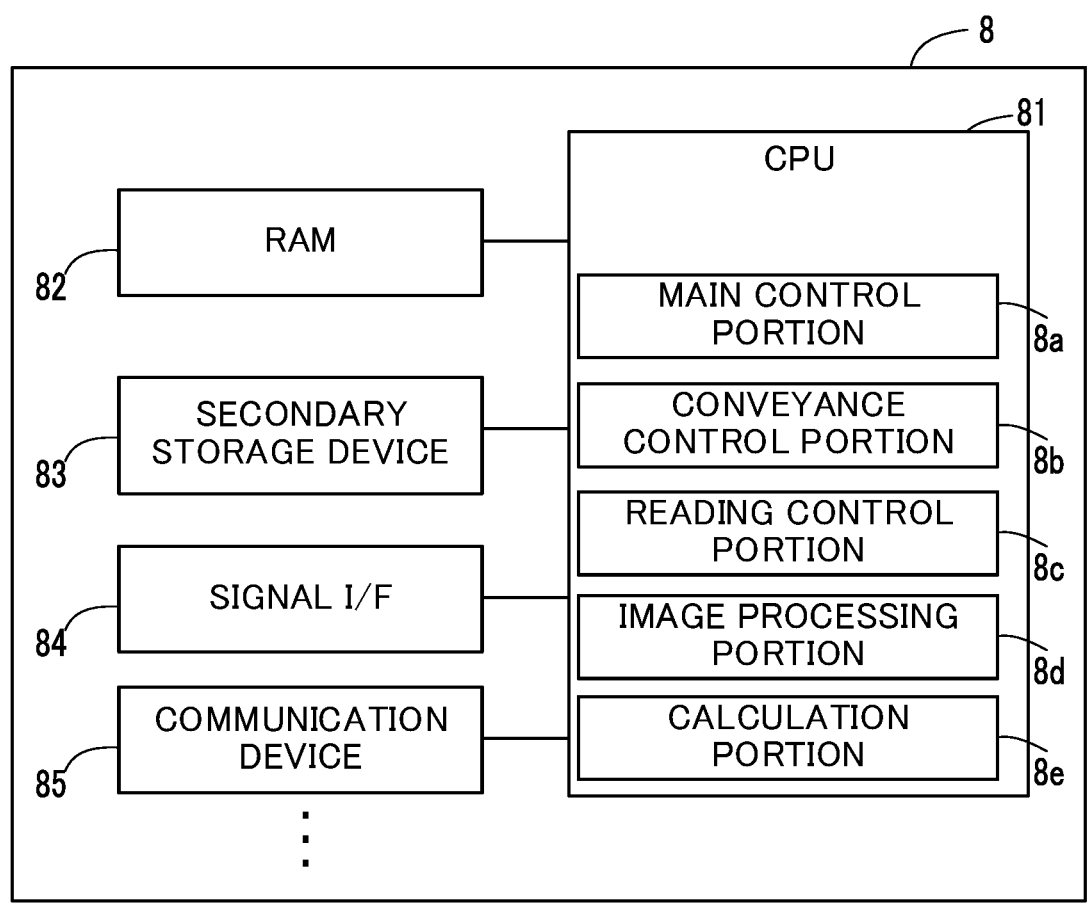
FIG. 3 is a block diagram showing a configuration of a control device in the image reading apparatus according to the first embodiment.

The control device 8 executes various types of data processing and controls the image reading apparatus 1. As shown in FIG. 3, the control device 8 includes a CPU (Central Processing Unit) 81, a RAM (Random Access Memory) 82, a secondary storage device 83, and peripherals such as a signal interface 84. The control device 8 further includes a communication device 85 that communicates with other devices.

The secondary storage device 83 is a computer-readable nonvolatile storage device. The secondary storage device 83 can store and update computer programs and various types of data. For example, either a flash memory or a hard disk drive, or both, may be adopted as the secondary storage device 83.

The signal interface 84 converts signals output by various types of sensors into digital data and transmits the converted digital data to the CPU 81. Furthermore, the signal interface 84 converts control commands output by the CPU 81 into control signals and transmits the control signals to components to be controlled.

The CPU 81 is a processor that executes the computer programs to execute various types of data processing and control. The RAM 82 is a computer-readable volatile storage device. The RAM 82 primarily stores the computer programs executed by the CPU 81 and data that is output or consulted by the CPU 81 during execution of various types of processing.

The CPU 81 includes a plurality of processing modules that are implemented when the computer programs are executed. The plurality of processing modules include a main control portion 8a, a conveyance control portion 8b, a reading control portion 8c, an image processing portion 8d, and a calculation portion 8e.

The main control portion 8a executes control that causes various types of processing to be started in response to operations on the operation device 801 and executes control of the display device 802.

The conveyance control portion 8b controls the conveying device 4 to control the conveyance of the document sheets 9. The reading control portion 8c controls the image reading portion 6 to cause the image reading portion 6 to execute the image reading process.

The image processing portion 8d executes various types of image processing on the read images obtained by the image reading process. The calculation portion 8e executes various types of mathematical calculations.

In the present embodiment, the document sheet conveying device 2 further includes a second discharge tray 3c (see FIGS. 1 and 2) on which the document sheets 9 can be stacked. The conveying device 4 can selectively execute a reverse conveyance process or a straight conveyance process.

The reverse conveyance process is a process of conveying the document sheets 9 on the supply tray 3a to discharge the document sheets 9 onto the first discharge tray 3b via the return path 40b. The straight conveyance process is a process of conveying the document sheets 9 on the supply tray 3a along a conveyance path branching off upstream of the return path 40b to discharge the document sheets 9 not to the first discharge tray 3b but to the second discharge tray 3c.

As shown in FIGS. 1 and 2, the second discharge tray 3c is disposed at a position away from the supply tray 3a and the first discharge tray 3b in the first direction D1. For example, the second discharge tray 3c may be collapsible along the outer edge of the cover portion 12.

The conveyance path 40 further includes a second outgoing path 40d. The second outgoing path 40d is connected to the incoming path 40a and extends in the first direction D1 to lead to a second exit 404 corresponding to the second discharge tray 3c.

That is, the conveyance path 40 branches out from the incoming path 40a into the return path 40b and the second outgoing path 40d.

In the description below, part of the conveyance path 40 from the incoming path 40a to the first outgoing path 40c via the return path 40b is referred to as "main path 40a-40c".

The second outgoing path 40d is an example of a branching path branching off at a point on the main path 40a-40c.

The conveying device 4 further includes a path switching mechanism 44. In addition, the image reading apparatus 1 further includes a third image reading portion 63 partly constituting the image reading portion 6.

The path switching mechanism 44 selectively guides the document sheets 9 conveyed along the incoming path 40a to either the return path 40b or the second outgoing path 40d. In other words, the path switching mechanism 44 can switch between a mode for guiding the document sheets 9 conveyed along the main path 40a-40c without changing the route and a mode for guiding the document sheets 9 conveyed along the main path 40a-40c to the second outgoing path 40d.

The conveying device 4 can perform a first operation of guiding the document sheets 9 to the return path 40b using the path switching mechanism 44 while operating the feed mechanism 41 and the pairs of conveying rollers 43.

Moreover, the conveying device 4 can perform a second operation of guiding the document sheets 9 to the second outgoing path 40d using the path switching mechanism 44 while operating the feed mechanism 41 and the pairs of conveying rollers 43.

The conveying device 4 performs the first operation to execute a first conveyance process of conveying the document sheets 9 on the supply tray 3a one by one along the main path 40a-40c and then discharging the document sheets 9 onto the first discharge tray 3b. The first conveyance process corresponds to the reverse conveyance process.

In addition, the conveying device 4 performs the second operation to execute a second conveyance process of conveying the document sheets 9 on the supply tray 3a one by one along the incoming path 40a and the second outgoing path 40d and then discharging the document sheets 9 onto the second discharge tray 3c. The second conveyance process corresponds to the straight conveyance process.

The third image reading portion 63 reads images on the first sides of the document sheets 9 passing through the second outgoing path 40d. The third image reading portion 63 has a configuration identical to that of the second image reading portion 62.

The conveying device 4 can selectively execute the first conveyance process or the second conveyance process according to the control by the conveyance control portion 8b.

As described above, the conveying device 4 can convey the document sheets 9 on the supply tray 3a one by one along the conveyance path 40 and then discharge the document sheets 9 from the conveyance path 40 to the first discharge tray 3b or the second discharge tray 3c.

Furthermore, the conveying device 4 can selectively execute discharge processes of a plurality of discharge procedures each having a different mode of discharge to the discharge trays 3b and 3c.

That is, the discharge process of a first discharge procedure, which is one of the plurality of discharge procedures, is a process of discharging the document sheets 9 from the first outgoing path 40c to the first discharge tray 3b.

In other words, the first discharge procedure is a procedure for discharging the document sheets 9 conveyed along the main path 40a-40c in a forward direction to the first discharge tray 3b. The forward direction refers to a direction from the first entrance 401 to the first exit 403 along the main path 40a-40c.

In addition, the discharge process of a second discharge procedure, which is another one of the plurality of discharge procedures, is a process of discharging the document sheets 9 from the second outgoing path 40*d* to the second discharge tray 3*c*.

In other words, the second discharge procedure is a procedure for discharging the document sheets 9 conveyed to a point on the main path 40*a*-40*c* in the forward direction to the second discharge tray 3*c* via the second outgoing path 40*d*.

The image reading apparatus 1 further includes a thickness sensor 5*d* (see FIG. 2). The thickness sensor 5*d* determines the thicknesses of the document sheets 9 conveyed along the incoming path 40*a*. For example, the thickness sensor 5*d* determines the capacitances of the document sheets 9. The document sheets 9 with higher capacitances have greater thicknesses.

In the description below, the image reading process executed while the conveying device 4 operates is referred to as "reading process in a conveying mode".

When the reading process in the conveying mode is executed, the conveyance control portion 8*b* can control the conveying device 4 to execute either the discharge process of the first discharge procedure or the discharge process of the second discharge procedure for each of the document sheets 9 based on the result of determination by the thickness sensor 5*d*.

In addition, the main control portion 8*a* can set specification information indicating the ordinal positions of the document sheets 9 that are to be subjected to the second conveyance process based on specification operations on the operation device 801.

When the reading process in the conveying mode is executed, the conveyance control portion 8*b* can control the conveying device 4 to execute either the discharge process of the first discharge procedure or the discharge process of the second discharge procedure for each of the document sheets 9 based on the specification information.

Setting the discharge procedure for each of the document sheets 9 is time consuming for users. The image reading apparatus 1 has a function of selectively discharging the document sheets 9, from which the images are read, from the conveyance path 40 by the discharge procedure based on the content of the images on the document sheets 9. The following describes the function.

The main control portion 8*a* starts a reading control in a sorting mode (see FIG. 4) when a predetermined start event occurs. The reading control in the sorting mode includes causing the conveying device 4 to convey the document sheets 9 and causing the image reading portion 6 to execute the image reading process.

For example, the start event is an event where a predetermined start operation performed on the operation device 801 is detected while the sorting mode is selected as an operation mode in advance and while the document sheets 9 on the supply tray 3*a* are detected by the supplied document sheet sensor 5*a*.

The main control portion 8*a* sets the sorting mode based on a selection operation on the operation device 801. Furthermore, the main control portion 8*a* causes the display device 802 to display placement guide information that provides guidance on how to place the document sheets 9 on the supply tray 3*a* when the sorting mode is set.

In the present embodiment, the placement guide information prompts the users to place the document sheets 9 on the supply tray 3*a* with the sides having images to be read facing downward. The users perform the start operation on the operation device 801 after placing the document sheets 9 on the supply tray 3*a* based on the placement guide information.

[Reading Control in Sorting Mode]

Figure 4:
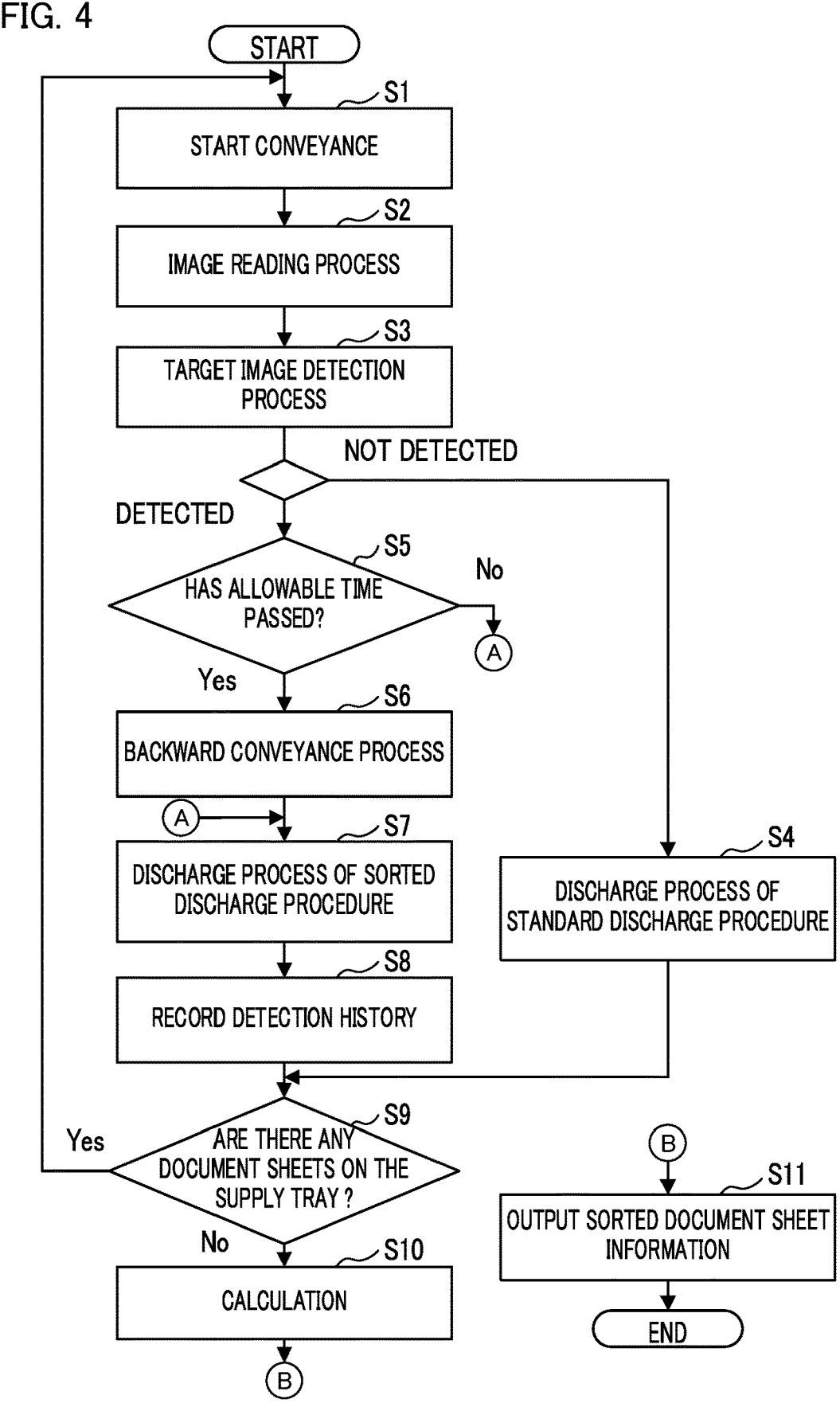
FIG. 4 is a flowchart showing an example of a procedure of a reading control in a conveying mode in the image reading apparatus according to the first embodiment.

The following describes an example of a procedure of the reading control in the sorting mode with reference to a flowchart shown in FIG. 4. The reading control in the sorting mode is an embodiment of an image reading control method.

In the following description, S1, S2, . . . are identification signs representing a plurality of steps in the reading control in the sorting mode. In the reading control in the sorting mode, a process in step S1 is started first.

<Step S1>

In step S1, the conveyance control portion 8*b* causes the conveying device 4 to start conveying a document sheet 9 and then moves the process to step S2.

In the present embodiment, the conveyance control portion 8*b* causes the conveying device 4 to start either the first conveyance process or the second conveyance process corresponding to a predetermined standard discharge procedure. The standard discharge procedure is the first discharge procedure or the second discharge procedure.

That is, in a case where the standard discharge procedure is the first discharge procedure, the conveyance control portion 8*b* causes the conveying device 4 to start the first conveyance process in step S1. In a case where the standard discharge procedure is the second discharge procedure, the conveyance control portion 8*b* causes the conveying device 4 to start the second conveyance process in step S1.

<Step S2>

In step S2, the reading control portion 8*c* causes the image reading portion 6 to execute the image reading process. Subsequently, the reading control portion 8*c* moves the process to step S3.

In the sorting mode, the reading control portion 8*c* causes the second image reading portion 62 to execute the image reading process.

The reading control portion 8*c* controls the timing at which the second image reading portion 62 is to be operated based on the timing at which the conveyed document sheet sensor 5*b* changes its state from "not detecting the document sheet 9" to "detecting the document sheet 9". Furthermore, the reading control portion 8*c* controls the timing at which the second image reading portion 62 is to be stopped based on the timing at which the conveyed document sheet sensor 5*b* changes its state from "detecting the document sheet 9" to "not detecting the document sheet 9".

<Step S3>

In step S3, the image processing portion 8*d* executes a target image detection process. The target image detection process is a process of detecting target images that satisfy a predetermined sorting condition associated with any one of the plurality of discharge procedures from the read images obtained in step S2.

The image processing portion 8*d* executes the target image detection process on the read images that have been obtained every time the read image of a predetermined size is obtained by the process in step S2.

In the present embodiment, the main control portion 8*a* can execute a discharge procedure setting process of associating the sorting condition with one of the first discharge procedure and the second discharge procedure based on a setting operation on the operation device 801.

The discharge procedure setting process is executed before the reading control in the sorting mode starts. The discharge procedure adopted when no target images are detected is the standard discharge procedure. In the description below, the discharge procedure associated with the sorting condition is referred to as "sorted discharge procedure". The sorted discharge procedure and the standard discharge procedure are different discharge procedures.

For example, the sorting condition includes either a first sorting condition or a second sorting condition, or both. The first sorting condition is a condition where images that satisfy a predetermined approximate condition defining the closeness to a registered image serve as the target images.

The image processing portion 8*d* executes a known pattern recognition process on the read images to determine whether the read images include the target images that satisfy the first sorting condition.

The second sorting condition is a condition where character string images representing registered character strings serve as the target images. The image processing portion 8*d* executes a known character recognition process on the read images to determine whether the read images include the target images that satisfy the second sorting condition.

Upon determining that no target images are detected by the target image detection process, the image processing portion 8*d* moves the process to step S4. Upon determining that any of the target images is detected, the image processing portion 8*d* moves the process to step S5.

<Step S4>

In step S4, the conveyance control portion 8*b* causes the conveying device 4 to execute the discharge process of the standard discharge procedure. Subsequently, the conveyance control portion 8*b* moves the process to step S9.

<Step S5>

In step S5, the conveyance control portion 8*b* determines whether a predetermined allowable time has passed since the start of conveyance of the document sheet 9, that is, whether a time overrun has occurred.

Upon determining that the time overrun has occurred, the conveyance control portion 8*b* moves the process to step S6. Otherwise, the conveyance control portion 8*b* moves the process to step S7.

The allowable time is a time required for the leading edge of the document sheet 9 conveyed in the forward direction to reach a predetermined allowable position from the start of conveyance of the document sheet 9. The allowable position is a farthest position in the forward direction allowing the path switching mechanism 44 to change the destination of the document sheet 9.

<Step S6>

In step S6, the conveyance control portion 8*b* causes the conveying device 4 to execute a backward conveyance process. The backward conveyance process is a process of conveying the document sheet 9 in a direction opposite the forward direction.

The conveyance control portion 8*b* adjusts the time at which the backward conveyance process is executed based on a time elapsed since a change in the state of the conveyed document sheet sensor 5*b* from "not detecting the document sheet 9" to "detecting the document sheet 9". The backward conveyance process causes the leading edge of the document sheet 9 to move back to the allowable position or to a position upstream of the allowable position in the forward direction.

After causing the conveying device 4 to execute the backward conveyance process, the conveyance control portion 8*b* moves the process to step S7.

<Step S7>

In step S7, the conveyance control portion 8*b* causes the conveying device 4 to execute the discharge process of the sorted discharge procedure. This causes the document sheet 9 from which any of the target images is detected to be discharged from the conveyance path 40 by the sorted discharge procedure. Subsequently, the conveyance control portion 8*b* moves the process to step S8.

<Step S8>

In step S8, the image processing portion 8*d* records information about detection history of the target images in the RAM 82 or in the secondary storage device 83. Subsequently, the image processing portion 8*d* moves the process to step S9.

For example, the information about the detection history includes at least one of the followings: information about document sheet numbers, condition identification information, detected position information, and the detected target images. The information about the document sheet numbers allows identification of the document sheets 9 from which the target images are detected. The condition identification information allows identification of the sorting condition met during the detection of the target images. The detected position information indicates the positions where the target images are detected.

<Step S9>

In step S9, the conveyance control portion 8*b* determines whether there are any document sheets 9 on the supply tray 3*a* based on the detection state of the supplied document sheet sensor 5*a*. Upon determining that there is one or more document sheets 9 on the supply tray 3*a*, the conveyance control portion 8*b* moves the process to step S1. Otherwise, the conveyance control portion 8*b* moves the process to step S10.

<Step S10>

In step S10, in a case where information about a calculation algorithm is associated with the sorting condition in advance, the calculation portion 8*e* executes a calculation based on the calculation algorithm. Subsequently, the calculation portion 8*e* moves the process to step S11.

It is noted that, in a case where the information about the calculation algorithm is not associated with the sorting condition, the calculation portion 8*e* skips the process in step S10 and moves the process to step S11.

The following describes a first example of the information about the calculation algorithm. In the first example, the document sheets may be lottery tickets. Furthermore, the sorting condition may be a condition where a plurality of images of winning numbers on the lottery tickets serve as the target images.

The information about the calculation algorithm in the first example includes information about set values such as a prize amount for each of the target images. Furthermore, the information about the calculation algorithm in the first example includes information that indicates a calculation of the sum of the set values corresponding to the detected target images.

In the first example, the calculation portion 8*e* executes a process of calculating the sum of the set values associated with the sorting condition corresponding to the detected target images.

The following describes a second example of the information about the calculation algorithm. In the second example, the sorting condition may be a condition where images of predetermined secret labels or keywords that represent secret document sheets serve as the target images.

The information about the calculation algorithm in the second example includes information that indicates a calculation of the proportion of the number of document sheets 9 from which the target images are detected to the total number of document sheets 9 for each of the target images.

In the second example, the calculation portion 8e executes a process of calculating the proportion of the number of document sheets 9 from which the target images are detected to the total number of document sheets 9 subjected to the reading control in the sorting mode.

It is noted that the conveyance control portion 8b counts the number of document sheets 9 fed by the conveying device 4 by counting the number of changes in the result of detection by the conveyed document sheet sensor 5b.

<Step S11>

In step S11, the main control portion 8a executes a process of outputting sorted document sheet information about the sorting condition corresponding to the detected target images. Subsequently, the main control portion 8a ends the reading control in the sorting mode.

In the present embodiment, the sorted document sheet information includes the information about the detection history recorded in step S8 and information about the calculation result obtained in step S10.

For example, the process of outputting the sorted document sheet information includes at least one of a display process, a recording process, and a transmission process.

The display process is a process of displaying the sorted document sheet information in the display device 802. The recording process is a process of recording the sorted document sheet information in the secondary storage device 83. The transmission process is a process of transmitting the sorted document sheet information to a predetermined device through the communication device 85.

As described above, the image processing portion 8d detects the target images that satisfy the predetermined sorting condition associated with any one of the plurality of discharge procedures from the read images (see step S3 in FIG. 4).

Furthermore, when the target images are detected, the conveyance control portion 8b causes the conveying device 4 to execute the discharge process of the discharge procedure corresponding to the target images (see steps S5 to S7 in FIG. 4). The processes in steps S5 to S7 are an example of a discharge control executed by the conveyance control portion 8b.

In addition, in steps S5 to S7, upon determining that the time overruns have occurred, the conveyance control portion 8b causes the conveying device 4 to convey the document sheets 9 in the direction opposite the forward direction and then to execute the discharge process of the sorted discharge procedure. Here, the sorted discharge procedure is the first discharge procedure or the second discharge procedure.

As described above, in a case where any of the target images corresponding to the sorting condition associated with the first discharge procedure or the second discharge procedure is detected after a predetermined time has passed since the start of conveyance of the document sheet 9 from which the target images is detected, the conveyance control portion 8b determines that the time overrun has occurred.

Adoption of the image reading apparatus 1 enables the document sheets 9, from which the images are read, to be selectively discharged from the conveyance path 40 by the discharge procedure based on the content of the images on the document sheets 9.

In addition, in the case where the information about the calculation algorithm is associated with the sorting condition in advance, the calculation portion 8e executes the calculation based on the calculation algorithm corresponding to the detected target images (see step S10). Furthermore, the main control portion 8a outputs the sorted document sheet information including the result of calculation by the calculation portion 8e (see step S11).

The output sorted document sheet information allows the users to easily understand the sorted state of the document sheets 9.

Second Embodiment

The following describes an image reading apparatus 1X according to a second embodiment. The image reading apparatus 1X differs from the image reading apparatus 1 only in part of the configuration.

Figure 5:
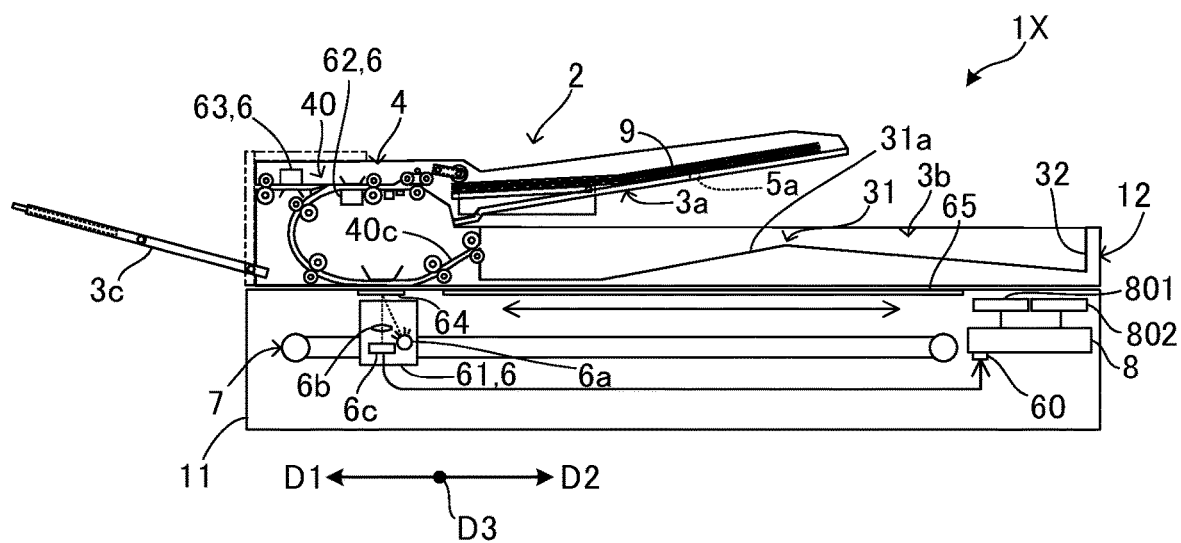
FIG. 5 is a configuration diagram of an image reading apparatus according to a second embodiment.

In FIG. 5, the same reference numbers and symbols are used for components identical to the components shown in FIGS. 1 and 2. In addition, in FIG. 5, part of the reference numbers and symbols shown in FIG. 2 is omitted. The following describes points in which the image reading apparatus 1X differs from the image reading apparatus 1.

In the image reading apparatus 1X, the discharge process of the first discharge procedure is a process in which the conveying device 4 discharges the document sheets 9 from the first outgoing path 40c at a predetermined reference speed. This causes the document sheets 9 to be discharged to a normal position adjacent to the first outgoing path 40c on the first discharge tray 3b.

In addition, in the image reading apparatus 1X, the plurality of discharge procedures includes a third discharge procedure. The discharge process of the third discharge procedure is a process in which the conveying device 4 discharges the document sheets 9 from the first outgoing path 40c at a speed faster than the reference speed. This causes the document sheets 9 to be discharged to a remote position on the first discharge tray 3b away from the first outgoing path 40c compared with the normal position.

The conveyance control portion 8b adjusts the starting points and the ending points of periods during which the pairs of the conveying rollers 43 are rotated at a higher speed than usual according to a first elapsed time and a second elapsed time based on the result of detection by the conveyed document sheet sensor 5b.

The first elapsed time is a time elapsed since a change in the state of the conveyed document sheet sensor 5b from "not detecting the document sheet 9" to "detecting the document sheet 9". The second elapsed time is a time elapsed since a change in the state of the conveyed document sheet sensor 5b from "detecting the document sheet 9" to "not detecting the document sheet 9".

In the present embodiment, one of the first discharge procedure and the third discharge procedure may be set as the standard discharge procedure, and the other may be set as the sorted discharge procedure. In this case, the conveyance control portion 8b skips steps S5 and S6 in the reading control in the sorting mode.

In addition, the first discharge tray 3b of the image reading apparatus 1X includes a protruding portion 31 on its upper surface. The protruding portion 31 divides the area on the first discharge tray 3b into an area adjacent to the first outgoing path 40c and an area away from the first outgoing path 40c.

A side surface of the protruding portion 31 adjacent to the first outgoing path 40c is an inclined surface 31a inclined upward in a discharge direction along which the document sheets 9 are discharged from the first outgoing path 40c. In the present embodiment, the discharge direction corresponds to the second direction D2.

The first discharge tray 3*b* further includes a stopper 32 formed downstream of the protruding portion 31 in the discharge direction. In the example shown in FIG. 5, the stopper 32 is an edge portion that forms a shoulder on the first discharge tray 3*b*.

The inclined surface 31*a* prevents the document sheets 9 discharged earlier by the first discharge procedure from moving to the remote position due to frictional force exerted by the document sheets 9 discharged later by the third discharge procedure.

The stopper 32 abuts on the leading edges of the document sheets 9 discharged by the third discharge procedure and thereby restricts the movement of the document sheets 9 in the discharge direction. The stopper 32 prevents the document sheets 9 discharged by the third discharge procedure from falling off the first discharge tray 3*b*.

In the present embodiment, in a case where the sorting condition is a condition that specifies the target images of a plurality of types, a different discharge procedure can be set for each of the target images. That is, in the discharge procedure setting process, the main control portion 8*a* can set a different discharge procedure for each of the target images as the sorted discharge procedure.

For example, the registered character strings in the sorting condition may include a first keyword and a second keyword. In this case, the first discharge procedure may be set as the sorted discharge procedure for the target images representing the first keyword, and the third discharge procedure may be set as the sorted discharge procedure for the target images representing the second keyword.

The image reading apparatus 1X produces effects similar to those produced by the image reading apparatus 1.

It is noted that another image reading apparatus may be adopted by removing components related to the second discharge procedure from the image reading apparatus 1X. The components related to the second discharge procedure include the second outgoing path 40*d*, the path switching mechanism 44, and the second discharge tray 3*c*.

First Application Example

The following describes a first application example of the image reading apparatus 1 or the image reading apparatus 1X.

In the present application example, the main control portion 8*a* can set part of the entire area of the read images as a target area from which the target images are to be detected.

In a case where the target area is set, the image processing portion 8*d* executes a process of detecting the target images from the target area in the read images in step S3 in FIG. 4. Setting the target area is effective in a case where the positions of images to be determined whether to satisfy the sorting condition on the document sheets 9 are already known.

For example, the main control portion 8*a* sets the target area based on an area setting operation on the operation device 801.

In addition, the conveyance control portion 8*b* may cause the conveying device 4 to execute the first conveyance process on a sample document sheet, and the reading control portion 8*c* may cause the image reading portion 6 to execute the image reading process on the sample document sheet.

In the above-described case, the main control portion 8*a* causes the display device 802 to display the read image corresponding to the sample document sheet. Furthermore, the main control portion 8*a* sets the target area based on an operation of specifying part of the area in the read image on the screen of the display device 802. The operation of setting the part of the area in the read image is an example of the area setting operation.

Setting the target area causes the process of detecting the target images to finish quickly (see step S3 in FIG. 4). This reduces the load on the CPU 81 and also reduces the time required for the backward conveyance process in the case where the document sheets 9 are discharged by the second discharge procedure.

Second Application Example

The following describes a second application example of the image reading apparatus 1 or the image reading apparatus 1X.

In the present application example, the main control portion 8*a* can set document sheet orientation information about the orientation of the document sheets 9 on the supply tray 3*a* when the reading control in the sorting mode is executed. Here, the document sheet orientation information is set relative to the orientation of document sheet images. The document sheet images are images formed on the document sheets 9.

For example, in a case where the document sheets 9 are placed on the supply tray 3*a* such that the upper ends of the document sheet images face forward, the document sheets 9 are in a normal orientation.

In a case where the document sheets 9 are placed on the supply tray 3*a* such that the lower ends of the document sheet images face forward, the document sheets 9 are in a 180° orientation rotated 180° from the normal orientation.

In a case where the document sheets 9 are placed on the supply tray 3*a* such that the right ends of the document sheet images face forward, the document sheets 9 are in a right 90° orientation rotated 90° to the right from the normal orientation.

In a case where the document sheets 9 are placed on the supply tray 3*a* such that the left ends of the document sheet images face forward, the document sheets 9 are in a left 90° orientation rotated 90° to the left from the normal orientation.

In a case where the document sheet orientation information is set, the image processing portion 8*d* executes the process of detecting the target images in step S3 in FIG. 4 based on the premise that the read images are in an orientation corresponding to the document sheet orientation information.

For example, in a case where the document sheet orientation information is not set, the image processing portion 8*d* executes the process of detecting the target images for all the candidates for the orientation of the read images. In this case, the process of detecting the target images takes a long time.

There may be a strong possibility that the target images lie in an area adjacent to the upper, lower, left, or right ends of the read images. In this case, the document sheets 9 are placed on the supply tray 3*a* such that the target images are located adjacent to the leading edges of the document sheets 9 in a conveying direction of the document sheets 9. Furthermore, the document sheet orientation information is set based on the orientation of the document sheets 9 on the supply tray 3*a*.

Setting the target area causes the process of detecting the target images to finish quickly (see step S3 in FIG. 4). This reduces the load on the CPU 81 and also reduces the time required for the backward conveyance process in the case where the document sheets 9 are discharged by the second discharge procedure. In addition, the combination of the first application example and the second application example is more effective.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading control method of controlling an image reading apparatus,
   the image reading apparatus comprising:
   a supply tray and at least one discharge tray on each of which document sheets can be stacked;
   a conveying device capable of conveying the document sheets on the supply tray one by one along a conveyance path to discharge the document sheets from the conveyance path to the discharge tray and capable of selectively executing discharge processes of a plurality of discharge procedures each having a different mode of discharge to the discharge tray; and
   an image reading portion configured to read images on the document sheets conveyed along the conveyance path to output data about read images,
   the image reading control method comprising:
   detecting a target image that satisfies a sorting condition set in advance and associated with any one of the plurality of discharge procedures from the read images; and
   in a case where the target image is detected, executing a discharge control that causes the conveying device to execute the discharge process of the discharge procedure corresponding to the target image.

2. The image reading control method according to claim 1, further comprising:
   outputting sorted document sheet information about the sorting condition corresponding to the detected target image.

3. The image reading control method according to claim 2, further comprising:
   in a case where the sorting condition is associated with information about a calculation algorithm in advance, executing a calculation based on the calculation algorithm corresponding to the detected target image to output the sorted document sheet information including a result of calculation.

4. The image reading control method according to claim 1, wherein
   in a case where the conveyance path includes a main path and a branching path branching off at a point on the main path, where the discharge tray includes a first discharge tray corresponding to the main path and a second discharge tray corresponding to the branching path, and where the plurality of discharge procedures include a first discharge procedure for discharging the document sheets conveyed along the main path in a forward direction to the first discharge tray and a second discharge procedure for discharging the document sheets conveyed to a point on the main path in the forward direction to the second discharge tray via the branching path,
   in a case where the target image corresponding to the sorting condition associated with the first discharge procedure or the second discharge procedure is detected after a predetermined time has passed since a start of conveyance of the document sheet from which the target image is detected, the discharge control includes conveyance of the document sheet in a direction opposite the forward direction and subsequent execution of the discharge process of the first discharge procedure or the second discharge procedure by the conveying device.

5. An image reading apparatus comprising:
   a supply tray and at least one discharge tray on each of which document sheets can be stacked;
   a conveying device capable of conveying the document sheets on the supply tray one by one along a conveyance path to discharge the document sheets from the conveyance path to the discharge tray and capable of selectively executing discharge processes of a plurality of discharge procedures each having a different mode of discharge to the discharge tray;
   an image reading portion configured to read images on the document sheets conveyed along the conveyance path to output data about read images; and
   a control portion capable of executing a process of the image reading control method according to claim 1.

* * * * *